United States Patent

Tarleton, Jr. et al.

Patent Number: 6,157,876
Date of Patent: Dec. 5, 2000

[54] METHOD AND APPARATUS FOR NAVIGATING AN AIRCRAFT FROM AN IMAGE OF THE RUNWAY

[75] Inventors: Norman G. Tarleton, Jr., Glendale; Dean R. Wilkens, Scottsdale, both of Ariz.; Peter F. Symosek, Shoreview, Minn.

[73] Assignee: Honeywell International Inc., Morristown, N.J.

[21] Appl. No.: 09/416,479

[22] Filed: Oct. 12, 1999

[51] Int. Cl.[7] ....................................... G06F 15/50
[52] U.S. Cl. .................. 701/16; 701/14; 701/18; 342/33; 342/63; 340/948; 340/951; 348/113; 348/117; 348/119; 73/178 T; 244/183
[58] Field of Search ................................... 701/16, 17, 18, 701/14, 200, 211, 300; 244/183, 114 R; 342/33, 450, 451, 46, 63; 73/178 T, 178 R; 340/945, 948, 951; 348/113, 117, 119

[56] References Cited

U.S. PATENT DOCUMENTS

| 5,343,395 | 8/1994 | Watts | 701/200 |
| 5,369,589 | 11/1994 | Steiner | 701/200 |
| 5,377,937 | 1/1995 | LaMay et al. | 244/185 |

*Primary Examiner*—William A. Cuchlinski, Jr.
*Assistant Examiner*—Yonel Beaulieu

[57] ABSTRACT

An image sensor attached to an aircraft generates an image. The image includes a runway and other objects. The edges within the image are detected and Nav Data is used to predict the coordinates defining the runway. The predicted coordinates and the detected edges are correlated to determine the location of the runway within the image. The location of the runway within the image is then used to determine the lateral and vertical deviation of the aircraft relative to the runway.

18 Claims, 7 Drawing Sheets

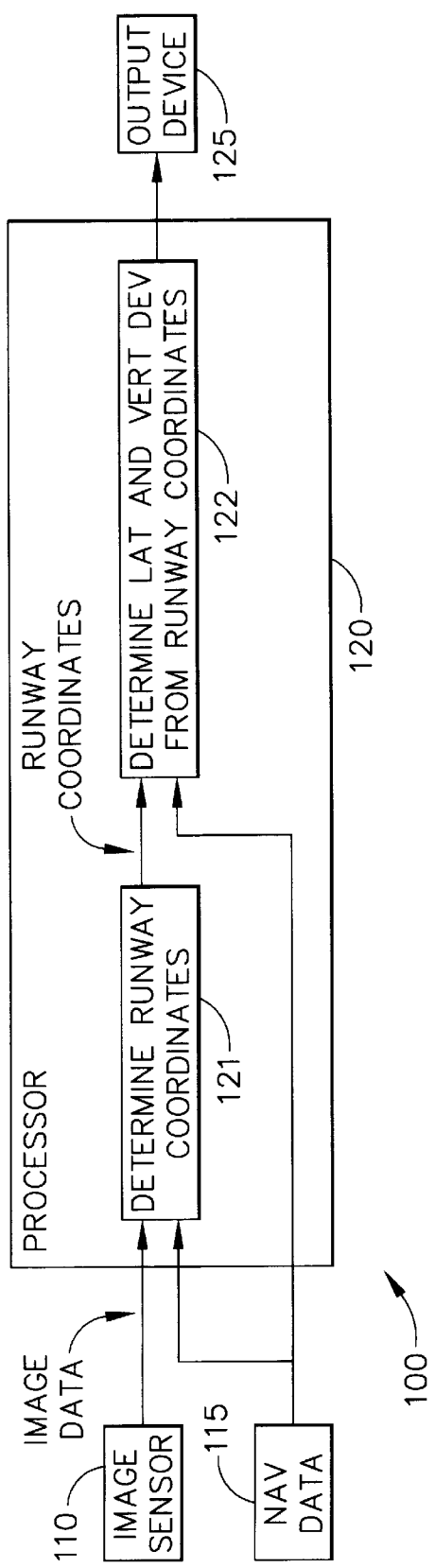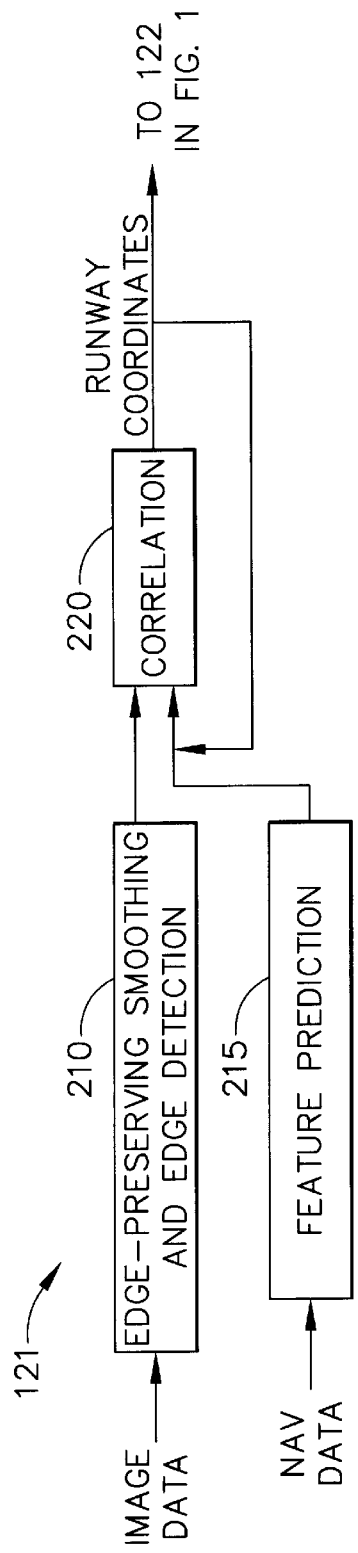

METHOD AND APPARATUS FOR NAVIGATING AN AIRCRAFT FROM AN IMAGE OF THE RUNWAY

BACKGROUND OF THE INVENTION

1. Technical Field

The present invention generally relates to aircraft equipped with an image sensor and, more particularly, to a method and apparatus for navigating the aircraft from an image of the runway.

2. Background Information

Aircraft, such as airplanes, helicopters, and spacecraft, are an increasingly important mode of transportation. Safely landing the aircraft is a critical aspect of operating the aircraft. Safely landing the aircraft requires accurately navigating the aircraft during runway approaches. Accurately navigating the aircraft includes directing the aircraft toward the runway and avoiding obstacles on or near the runway. This requires one of two things: (1) the pilot has a clear view of the runway and the obstacles on the runway from the time that the aircraft is a predetermined height above the earth until the time that the aircraft lands, or (2) the aircraft is provided with accurate navigational information. In low visibility conditions such as darkness, fog, low cloud cover, and other low visibility weather conditions, the pilot may not have a clear view of the runway and the obstacles on the runway when the aircraft is below the predetermined height (referred to as a low approach). In those situations, accurate navigational information is required to safely land the aircraft.

The navigational information traditionally used in an aircraft consists of Navigational Data (Nav Data). Nav Data is generated by many sources such as sensors on the aircraft, satellites, ground-based devices, and the aircraft database. Examples of sensors on the aircraft include an inertial reference system (IRS), and an attitude/heading reference system (AHRS). Examples of ground-based devices include an instrument landing system (ILS), a microwave landing system (MLS), and a differential global positioning system (DGPS). Examples of Nav Data include pitch, roll, yaw, Nav Data lateral deviation, Nav Data vertical deviation, barometric altitude, global positioning information, and runway data such as runway heading, runway position, runway length, and runway width.

Nav Data cannot be used to navigate the aircraft to avoid obstacles on or near the runway because Nav Data does not provide information about these obstacles. In addition, even in the absence of obstacles, many sources of Nav Data are not accurate enough to safely land the aircraft while making a low approach. The sources of Nav Data that have the required accuracy to safely make low approaches in the absence of obstacles are some ground-based devices. These instruments either provide Nav Data for an entire airport (for example, DGPS), or provide Nav Data for an individual runway (for example ILS). These devices are expensive, with the expense increasing as the device maintains acceptable accuracy at lower predetermined heights. As a result, many airports are not equipped with these devices, or only a small number of the runways at these airports are equipped with these devices.

Thus, there is a need to provide additional navigational information to an aircraft that indicates obstacles on or near the runway, is accurate enough to safely land the aircraft, and is generated by a relatively inexpensive device.

SUMMARY OF THE INVENTION

The present invention overcomes the foregoing problems and achieves an advance in the art by providing a method and apparatus for navigating an aircraft using an image of the runway.

In accordance with an aspect of the present invention, the coordinates of the runway are determined from an image of the runway generated by an image sensor attached to the aircraft. The runway coordinates are then used to navigate the aircraft.

In accordance with another aspect of the present invention, the lateral deviation and the vertical deviation of the aircraft relative to the runway are determined from runway coordinates defining the runway in an image. The image is generated by an image sensor attached to the aircraft. The lateral deviation and the vertical deviation are then used to navigate the aircraft.

The term "navigate the aircraft" in the above aspects of the present invention is defined broadly. This term includes, individually or in combination, directing the aircraft toward the runway, directing the aircraft to avoid obstacles on or near the runway, using the image to verify the integrity of Nav Data, and using Nav Data to verify the integrity of the image.

BRIEF DESCRIPTION OF THE DRAWINGS

FIG. 1 is a simplified block diagram illustrating an example of an aircraft imaging system in accordance with an aspect of the present invention.

FIG. 2 illustrates an example of a method used to determine runway coordinates from image data in accordance with an aspect of the present invention.

DETAILED DESCRIPTION

FIG. 1 is a simplified block diagram illustrating an example of an aircraft imaging system in accordance with an aspect of the present invention. As shown in FIG. 1, an image sensor 110 is attached to an aircraft. The image sensor 110 is mounted in a forward-looking position on, for example, the aircraft's nose, wing, or landing gear. Examples of an image sensor 110 include forward-looking infrared (FLIR), passive millimeter wave (PMMW), active millimeter wave (AMMW), and a camera.

Figure 3A:
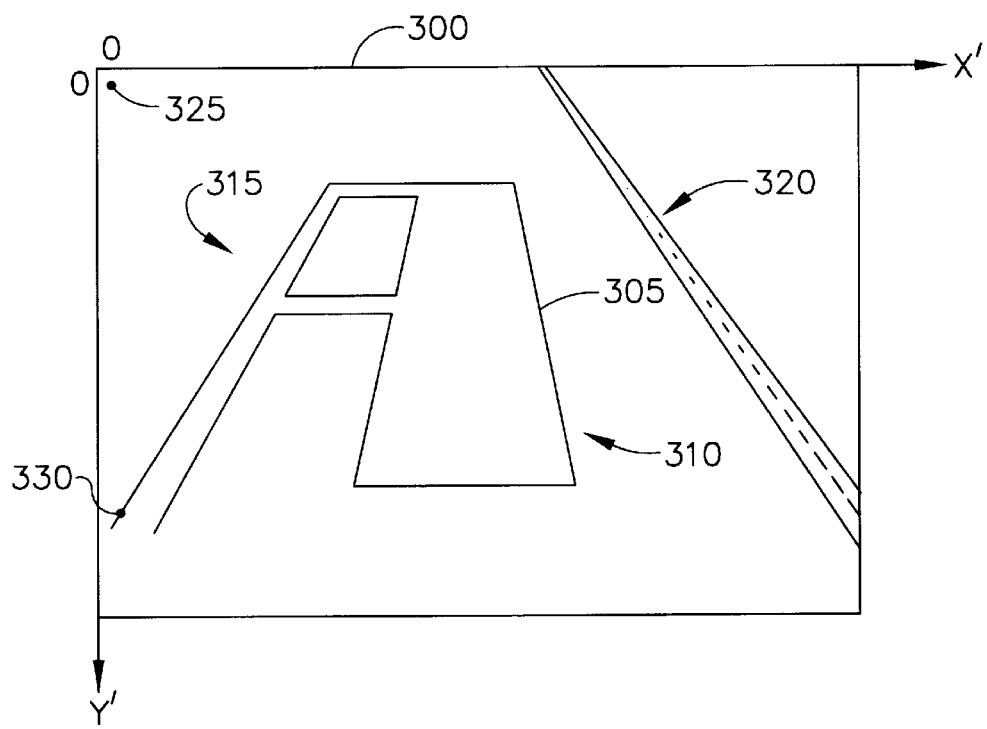
FIG. 3A illustrates an example of a grid representing the image after edge-preserving smoothing and edge detection in accordance with an aspect of the present invention.

FIG. 3A illustrates an example of a grid representing the image after edge-preserving smoothing and edge detection in accordance with an aspect of the present invention. The image sensor 110 provides an image of the runway 310 and other objects within its field of view (see FIG. 3A). These other objects may include a taxiway 315, a highway 320, and buildings (see FIG. 3A). The image sensor 110 provides multiple images over time. For example, the image sensor can capture a first image at time one and a second image at time two. The image sensor 110 generates either a digital image represented by digital signal samples or an analog image. If the image is analog, then the image is sampled to create the digital signal samples. The digital signal samples of an image are referred to as image data. Each of the digital signal samples of an image corresponds to a brightness value at an (a,b) grid coordinate 325 on a grid 300 representing the image. For example, a raster image is represented by the grid 300 having (x',y') grid coordinates 325. Thus, the first digital signal sample of the image may correspond to a brightness value at the (0,0) grid coordinate 325, and the second digital signal sample of the image may correspond to a brightness value at the (1,0) grid coordinate 325.

As shown in FIG. 1, in operation, Nav Data 115, as defined above, and image data are received by processor 120. Processor 120 is any type of processing device such as a microprocessor, a digital signal processor, a general-purpose computer, firmware, or an ASIC. The processor 120 processes the image data and the Nav Data 115 and provides navigational information for utilization by an output device 125. Examples of the output device 125 include a processor, a display, and an automatic flight control system.

The processor 120 processes one image at a time. At step 121, the processor uses the image data and the Nav Data 115 to determine runway coordinates 350 shown in FIG. 3C. FIG. 3C illustrates an example of the location of runway coordinates 350 on the grid 300 in accordance with an aspect of the present invention. The runway coordinates 350 are grid coordinates 325 (see FIG. 3A) that define the runway 310 (see FIG. 3A) in the image. Defining the runway 310 requires a minimum of four runway coordinates 350. The four runway coordinates 350 define the slope of both sides of the runway 310 and the location of one end of the runway 310. The remainder of the runway 310 can be determined using the known length of the runway 310 from end to end.

The runway coordinates 350 are used directly by the output device 125 as navigational information. Alternatively, the runway coordinates 350 and the Nav Data 115 are used at step 122 to determine the lateral deviation and the vertical deviation of the aircraft relative to the runway 310. The lateral deviation and vertical deviation are used by the output device 125 as navigational information.

Figure 3B:
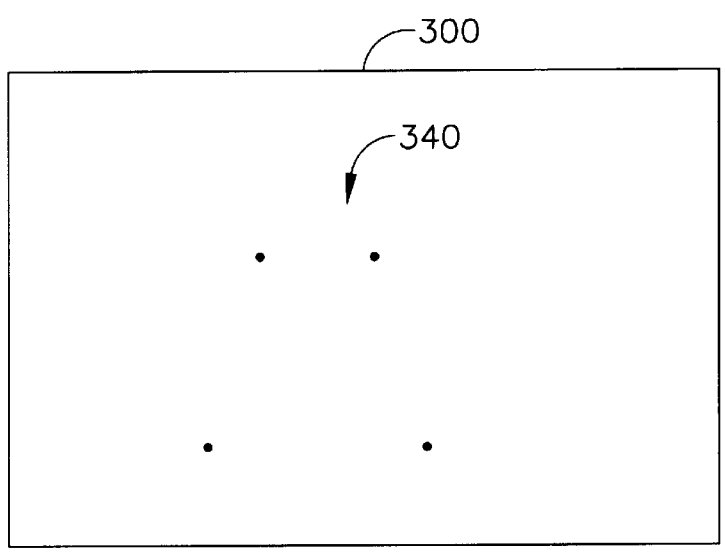
FIG. 3B illustrates an example of the location of predicted coordinates on the grid in accordance with an aspect of the present invention.
Figure 3C:
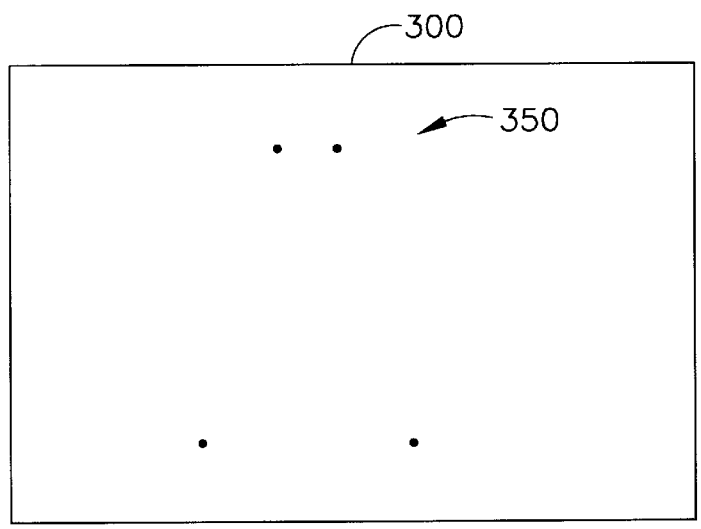
FIG. 3C illustrates an example of the location of runway coordinates on the grid in accordance with an aspect of the present invention.

In the following discussion, FIG. 2, FIG. 3A, FIG. 3B, and FIG. 3C are described in conjunction with one another. FIG. 2 illustrates an example of a method used to determine runway coordinates 350 from image data in accordance with an aspect of the present invention. FIGS. 3A, 3B, and 3C use a grid 300 to illustrate the brightness values of grid coordinates 325 at various stages of the process. Illustrating the brightness values on a grid 300 facilitates the discussion of the process. Typically, however, the processor 120 uses a memory array to store the grid coordinates 325 of interest at each stage of the process.

At step 210, the image data is processed using an edge-preserving smoothing and edge detection algorithm. This algorithm smoothes the image by removing noise within the image. The edges within the image are preserved during this smoothing process. The algorithm then detects the edges of various objects within the image. Edge detection may be used without edge-preserving smoothing depending on the amount of noise within the image and the amount of precision desired. Many image processing algorithms are known in the art for performing edge-preserving smoothing and edge detection.

An example of the result of step 210 is illustrated in FIG. 3A. Detected edges 305 of the runway 310, the taxiway 315, and the highway 320 are depicted. The detected edges 305 are defined only at grid coordinates 325, but for simplicity of illustration, the detected edges 305 are depicted as having brightness values between grid coordinates 325. The grid coordinates 325 defining the detected edges 305 are referred to as edge coordinates 330.

At step 215, Nav Data 115, including aircraft longitude, latitude, altitude, pitch, roll, and yaw, and runway latitude, longitude, and altitude, is used to predict the features of the runway 310. The predicted features of the runway 310 are defined by predicted coordinates 340 shown in FIG. 3B. FIG. 3B illustrates an example of the location of predicted coordinates 340 on the grid 300 in accordance with an aspect of the present invention. The prediction is accomplished using transformations known in the art. For example, since the predicted coordinates 340 will be compared to the detected edges 305 in the image (at correlation step 220), the predicted coordinates 340 are derived by transforming from the Nav Data 115 coordinate system to the image coordinate system. The image coordinate system is the (x',y') coordinate system of the grid 300. Nav Data 115 is typically defined relative to the geodetic coordinate system. Thus, an example of a transformation includes transforming from the geodetic coordinate system to the local-level coordinate system of the aircraft; transforming from the local-level coordinate system of the aircraft to the aircraft body coordinate system; transforming from the aircraft body coordinate system to the image sensor 110 coordinate system; and transforming from the image sensor 110 coordinate system to the (x',y') image coordinate system, e.g., grid coordinates 325.

An example of the result of step 210 is illustrated in FIG. 3B. The features of the runway 310 are defined by a minimum of three edges of the runway 310. These three edges define both sides of the runway 310 and one end of the runway 310. Each of these three edges are defined by a minimum of two grid coordinates 325 along each edge. These grid coordinates 325 are referred to as predicted coordinates 340. In FIG. 3B, for example, the predicted coordinates 340 are the four corners of the runway 310. Thus, each of the four edges of the runway 310 are defined by two grid coordinates 325. Grid coordinates 325 other than the four corners of the runway 310 can be used to define both sides and one end of the runway 310.

At step 220, the edge coordinates 330 and the predicted coordinates 340 are correlated to determine which detected edges 305 correspond to the runway 310. Correlation refers to determining the edge coordinates 330 that match, within a predetermined error, the predicted coordinates 340. The correlation is accomplished using algorithms known in the art, such as "geometric hashing." Runway coordinates 350 result from performing the correlating step 220. In one aspect of the present invention, the runway coordinates 350 become the predicted coordinates 340 used by the correlation step 220 for processing the next image. In another aspect of the present invention, the Nav Data 115 is again used by the feature prediction step 215 to determine the predicted coordinates 340 used by the correlation step 220 for processing the next image.

An example of the result of step 220 is illustrated in FIG. 3C. The runway coordinates 350 are a minimum of four edge coordinates 330 that match, within a predetermined error, a minimum of four predicted coordinates 340. If predicted coordinates 340 other than the four corners of the runway 310 are used to define both sides and one end of the runway 310, then the runway coordinates 350 will only define both sides and one end of the runway 310. The remaining end of the runway 310 can be determined using the known length of the runway 310 from end to end.

Figure 4:
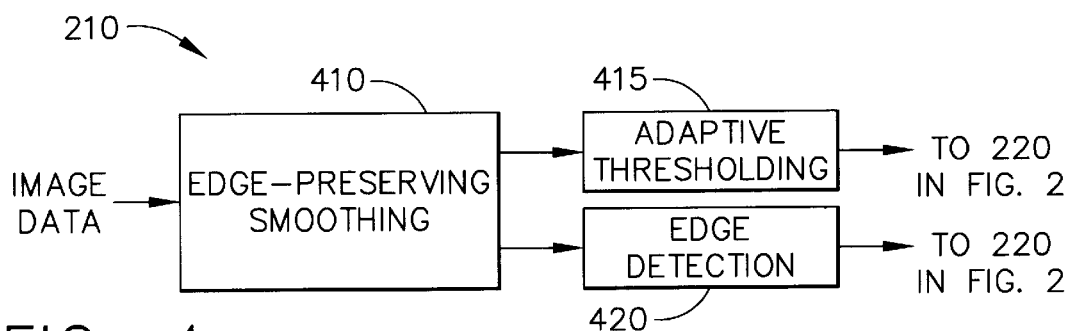
FIG. 4 illustrates an example of a method used to perform the edge-preserving smoothing and edge detection in accordance with an aspect of the present invention.

If a low resolution image sensor 110 is used, or if more precision is desired, step 210 may be implemented as shown in FIG. 4. FIG. 4 illustrates an example of a method used to perform the edge-preserving smoothing and edge detection in accordance with an aspect of the present invention. At step 410, the processor 120 smoothes the image by removing noise within the image. The edges within the image are preserved during this smoothing process. The edge-preserving smoothing is accomplished using algorithms known in the art, such as the Nagao Edge-Preserving Smoothing algorithm.

The result of step 410 is used at steps 415 and 420. At step 415, the processor 120 performs adaptive thresholding. Adaptive thresholding is accomplished using algorithms known in the art, such as the Adaptive Thresholding algorithm. Adaptive thresholding detects an entire structure within the image including the edges of the structure. A "structure" refers to things within the image having edges, such as the runway 310, the taxiway 315, and the highway 320. Thus, for example, after performing adaptive thresholding, the grid coordinates 325 defining the runway 310 edges 305 and the runway 310 interior have brightness values of '0', while a plurality of the grid coordinates 325 exterior to the runway 310 edges 305 have brightness values of '1'. The interior of the runway 310 is defined as the area enclosed by the edges 305 of the runway 310, and the exterior of the runway 310 is defined as the remaining area of the grid 300 minus the runway edges 305.

At step 420, the processor 120 performs edge detection. Edge detection is accomplished using algorithms known in the art, such as the Sobel Edge Detection algorithm. Edge detection detects only the edges of structures within the image. FIG. 3A illustrates an example of detected edges 305 resulting from the edge detection algorithm.

Figure 5:
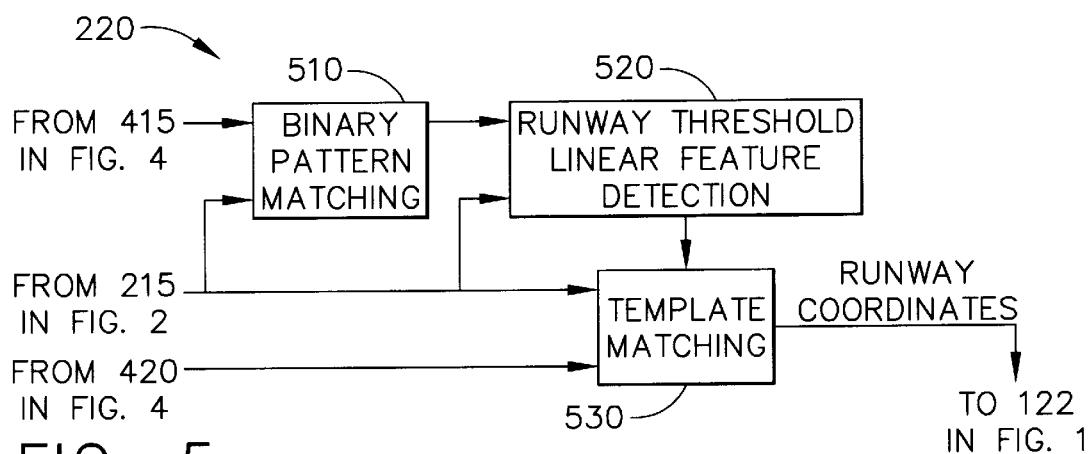
FIG. 5 illustrates an example of a method used to perform the correlation step in accordance with an aspect of the present invention.

If a low resolution image sensor 110 is used, or if more precision is desired, step 220 may be implemented as shown in FIG. 5. FIG. 5 illustrates an example of a method used to perform the correlation step 220 in accordance with an aspect of the present invention. At step 510, the processor 120 performs binary pattern matching using the result of the adaptive thresholding at step 415 and the result of the feature prediction at step 215. The binary pattern matching step 510 determines the edge coordinates 330 that match, within a predetermined error, the predicted coordinates 340.

Figure 6:
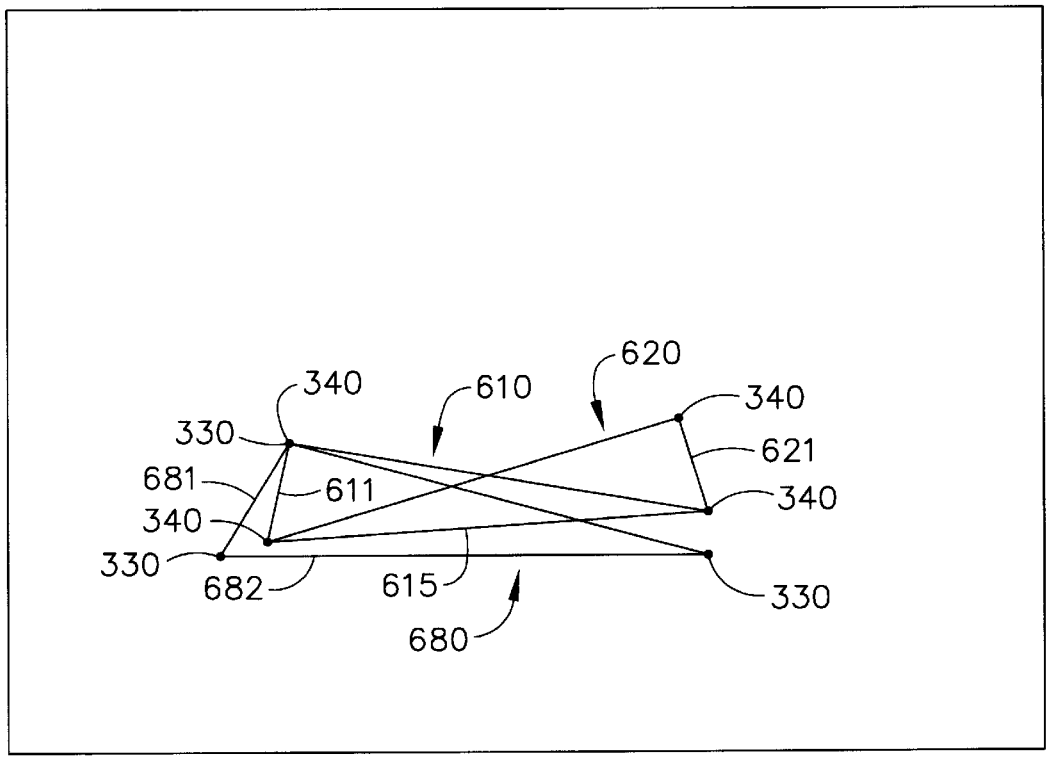
FIG. 6 illustrates an example of triangular regions defined by the predicted coordinates and a triangular region defined by the edge coordinates.

An example of performing binary pattern matching at step 510 is described in conjunction with FIG. 6. FIG. 6 illustrates an example of triangular regions 610 and 620 defined by the predicted coordinates 340 and a triangular region 680 defined by the edge coordinates 330. Binary pattern matching at step 510 is performed using the Binary Pattern Match algorithm. The Binary Pattern Match algorithm utilizes a first triangular region 610 defined by the predicted coordinates 340 of one side and one end of the runway 310, and a second triangular region 620 defined by the predicted coordinates 340 of the other side and the end of the runway 310. The Binary Pattern Match algorithm determines the edge coordinates 330, resulting from the adaptive thresholding step 415, that match, within a predetermined error, the first or second triangular regions 610 or 620. Each set of edge coordinates 330 that match define a matching triangular region 680. There are typically multiple matching triangular regions 680, but for simplicity, only one matching triangular region 680 is shown in FIG. 6.

Various error criteria can be used in determining a match, examples of which are: (1) there are no grid coordinates 325 having a brightness value of '1' within the matching triangular region 680, (2) there is at least one grid coordinate 325 having a brightness value of '1' outside of the matching triangular region 680 and adjacent to the leg 681 of the matching triangular region 680 that may define a side of the runway 310, (3) there is at least one grid coordinate 325 having a brightness value of '1' outside of the matching triangular region 680 and adjacent to the leg 682 of the matching triangular region 680 that may define an end of the runway 310, (4) the number of grid coordinates 325 having a brightness value of '1' outside of the matching triangular region 680 and adjacent to the leg 682 of the matching triangular region 680 that may define an end of the runway 310 is within a predetermined percentage of the number of grid coordinates 325 having a brightness value of '1' outside of the area defined by the first or second triangular regions 610 or 620 and adjacent to the leg 615 of the first or second triangular regions 610 or 620 that defines an end of the predicted runway 310, and (5) the number of grid coordinates 325 having a brightness value of '1' outside of the matching triangular region 680 and in a row of the grid 300 above the row of the grid 300 of the apex of the leg 682 of the matching triangular region 680 that may define an end of the runway 310 is within a predetermined percentage of the number of grid coordinates 325 having a brightness value of '1' outside of the area defined by the first or second triangular regions 610 or 620 and in a row of the grid 300 above the row of the grid 300 of the apex of the leg 615 of the first or second triangular regions 610 or 620 that define an end of the predicted runway 310.

At step 520 in FIG. 5, the processor 120 performs runway threshold linear feature detection using the result of the binary pattern matching at step 510 and the result of the feature prediction at step 215. The runway threshold linear feature detection step 520 determines which pair of matching triangular regions 680 most closely matches the first triangular region 610 and the second triangular region 620. This determination is made by calculating a degree of match metric. An example of a degree of match metric uses the sum of three terms. The first term is the absolute value of the difference between the slope of the leg 611 or 621 of the first or second triangular region 610 or 620 that defines a side of the runway 310 and the slope of the leg 681 of the matching triangular 680 region that may define the side of the runway 310. The second term and third terms are the Cartesian distances between the apexes of the first and second triangular regions 610 and 620 and the corresponding apexes of the matching triangular regions 680.

At step 530, the processor 120 performs template matching using the result of the runway threshold linear feature detection at step 520, the result of the edge detection at step 420, and the result of the feature prediction at step 215. Template matching determines which grid coordinates 325 define the remaining end of the runway 310. This determination is made by calculating a degree of match metric. An example of a degree of match metric uses the sum of two terms. The first term is the absolute value of the difference between the slope of the leg 681 of the matching triangular region 680 defining a side of the runway 310 and the detected edge 305 of the side of the runway 310. The second term is the perpendicular distance between the apex of the matching triangular region 680 and the detected edge 305. If less precision is required, template matching can be omitted, and the remaining end of the runway 310 can be determined using the known length of the runway 310 from end to end.

Figure 7:
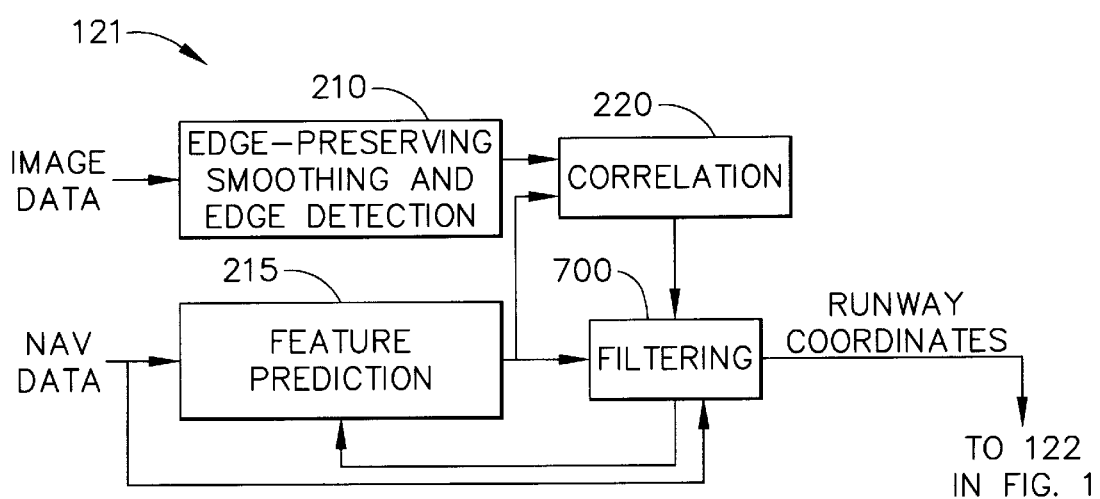
FIG. 7 illustrates an example of filtering after the correlating step in accordance with an aspect of the present invention.
Figure 8:
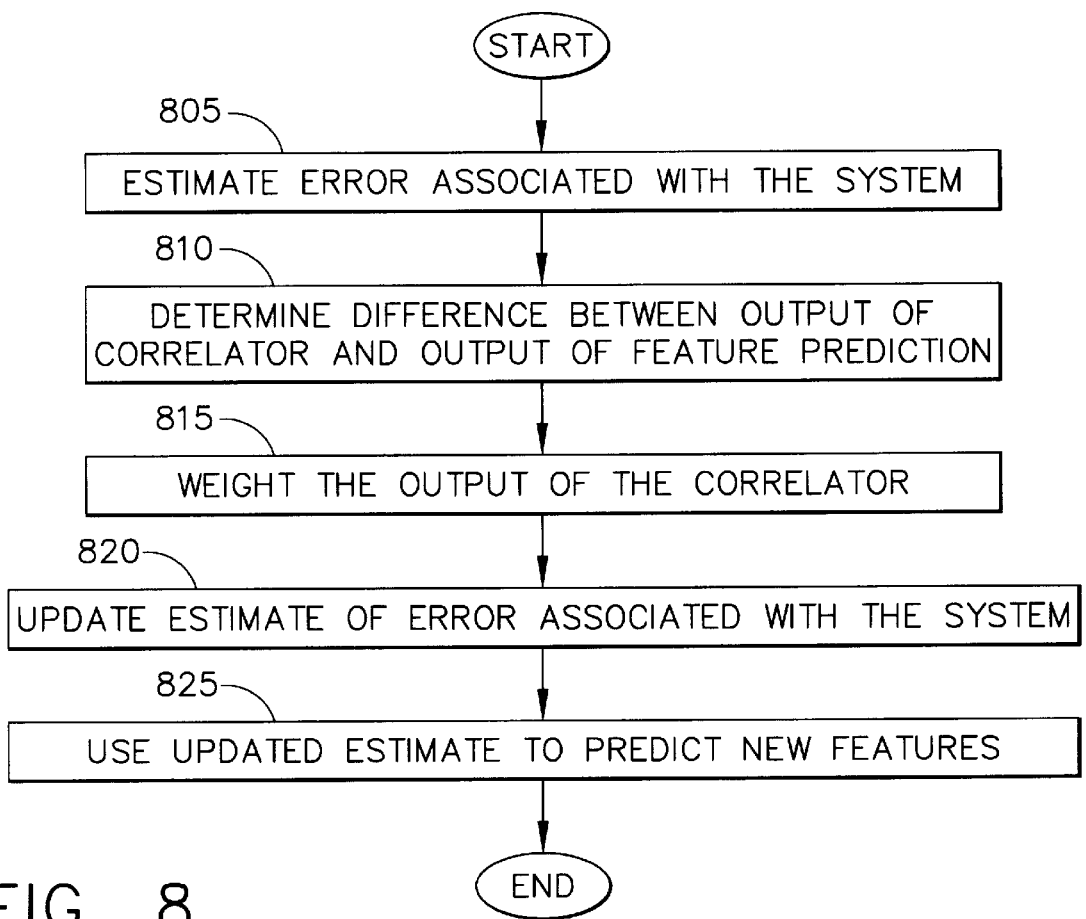
FIG. 8 illustrates an example of the steps performed by the filtering step in accordance with an aspect of the present invention.

If a low resolution image sensor 110 is used, or if more precision is desired, a filtering step can be added after the correlation step 220 in FIG. 2. The filtering step is depicted in FIG. 7. FIG. 7 illustrates an example of filtering, at step 700, after the correlating step 220 in accordance with an aspect of the present invention. FIG. 8 illustrates an example of the steps performed by the filtering step 700 in accordance with an aspect of the present invention. In FIG. 7, the edge-preserving smoothing and detecting step 210, the feature prediction step 215, and the correlation step 220 are performed as discussed above. At step 700, filtering is performed using the result of the correlation step 220. This filtering is typically implemented by performing the steps shown in FIG. 8. First, the error associated with the system is estimated at step 805. The system is typically defined as the image sensor 110, the Nav Data 115, and the processor 120 performing the edge-preserving smoothing and detection at step 210, the feature prediction at step 215, and the correlation at step 220. At step 810, the difference between the output of the correlation step 220 and the output of the feature prediction step 215 is compared to the known image sensor 110 error. At step 815, the difference is used to determine an amount of weighting to apply to the output of the correlation step 220, where the weighting has a value between 0 and 1. If the estimated statistical variance of the difference exceeds the known image sensor 110 error, the weighting has a larger value. The weighted output of the correlation step 220 becomes the runway coordinates 350 that provide the input to step 122 in FIG. 1. At step 820, the difference is used to update the estimate of the error associated with the system. At step 825, the updated estimate of the error of the system is used to update Nav Data 115. The updated Nav Data is used by the feature prediction step 215 in FIG. 7 to update the predicted coordinates 340 of the runway 310. The updated predicted coordinates 340 are used for processing the next image. As further images are processed, the updated Nav Data can be generated in a variety of ways. For example, as described above, the updated estimate of the error of the system can be used to update Nav Data 115. As another example, the updated estimate of the error of the system can be used to update the last updated Nav Data.

The filtering at step 700 is typically performed using a type of Kalman filter. Examples of Kalman filters include an Extended Kalman filter, a linearized Kalman filter, an iterated extended Kalman filter, and a second-order Kalman filter. An example of using an Extended Kalman filter is described as follows. A nine-element state vector is used in the Extended Kalman filter. The nine elements are: three components of Nav Data 115 position error defined in terms of the local-level coordinate system; three components of Nav Data 115 velocity error defined in terms of the local-level coordinate system; and three small angles representing the error in the rotation matrix between the sensor coordinate system and the body coordinate system.

The Extended Kalman filter is initialized by setting the state vector to zero. The initial covariance matrix is diagonal, with the variances for the initial condition errors based on expected levels of selected availability affecting GPS position and velocity, and on the assumed 0.5 degree (deg) misalignment of the image sensor 110 to the aircraft's inertial reference. Examples of the variances for the initial condition errors are as follows:

$P\_11 = 10000$ ft$^2$ $P\_22 = 10000$ ft$^2$ $P\_33 = 40000$ ft$^2$ $P\_44 = 2.25$ ft$^2$/sec$^2$ $P\_55 = 2.25$ ft$^2$/sec$^2$ $P\_66 = 9$ ft$^2$/sec$^2$ $P\_77 = 0.25$ deg$^2$ $P\_88 = 0.25$ deg$^2$ $P\_99 = 0.25$ deg$^2$ Measurements processed by the Extended Kalman filter are azimuth and elevation angle differences between the output of the correlation step 220 and the output of the feature prediction step 215.

In step 122 of FIG. 1, the processor 120 determines the lateral deviation and the vertical deviation of the aircraft relative to the runway 310 by using the four corners of the runway 310. The four corners of the runway 310 are determined from the runway coordinates 350 from step 121. Thus, each corner of the runway 310 is defined by an (x',y') pair on the grid 300. There are many ways of determining the lateral deviation and the vertical deviation of the aircraft relative to the runway. An example is illustrated in FIG. 9.

Figure 9:
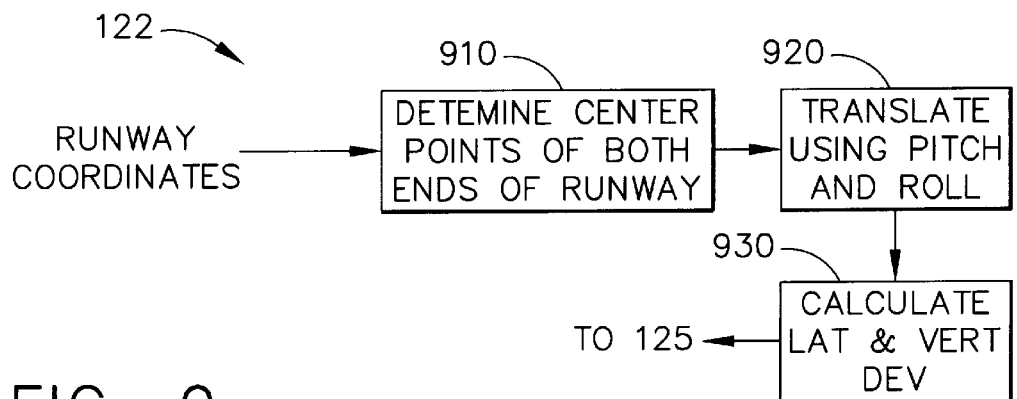
FIG. 9 illustrates an example of a method used to calculate the lateral and vertical deviation of the aircraft relative to the runway in accordance with an aspect of the present invention.
Figure 10:
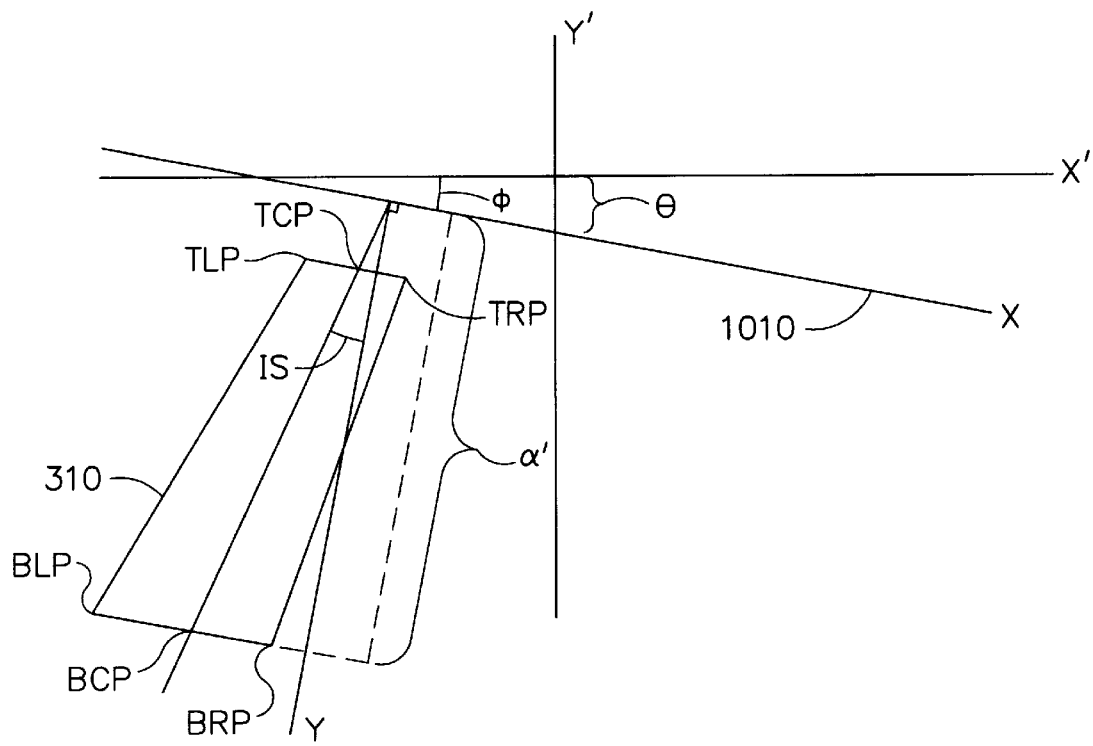
FIG. 10 illustrates a perspective view of the runway in relation to the pitch and the roll of the aircraft.

FIG. 9 illustrates an example of a method used to calculate the lateral and vertical deviation of the aircraft relative to the runway 310 in accordance with an aspect of the present invention. FIG. 10 is discussed in conjunction with FIG. 9 to show the relationships between some of the variables used in the method of FIG. 9. FIG. 10 illustrates a perspective view of the runway 310 in relation to the pitch $\theta$ and the roll $\phi$ of the aircraft. The four corners of the runway 310 are represented by the top left point (TLP), the top right point (TRP), the bottom left point (BLP), and the bottom right point (BRP), and the center points of both ends of the runway 310 are represented by the top center point (TCP) and the bottom center point (BCP). Each of these points is represented by an (x',y') pair on the grid 300. For example, the TLP is represented by x'$_{TLP}$ and y'$_{TLP}$. The (x,y) coordinate system is relative to the horizon line 1010. The runway threshold depression angle, $\alpha'$, is defined as the y coordinate of the BCP. The inverse slope (IS) is defined as $\arctan((x_{TCP} - x_{BCP})/(y_{TCP} - y_{BCP}))$.

At step 910 in FIG. 9, the center points, TCP and BCP, of both ends of the runway 310 are determined from the four corners of the runway 310, TLP, TRP, BLP, and BRP. One way of accomplishing this is:

$$(x',y')_{TCP} = ((x'_{TLP} + x'_{TRP})/2, (y'_{TLP} + x'_{TRP})/2)$$

$$(x',y')_{BCP} = ((x'_{BLP} + x'_{BRP})/2, (y'_{BLP} + x'_{BRP})/2)$$

Figure 11:
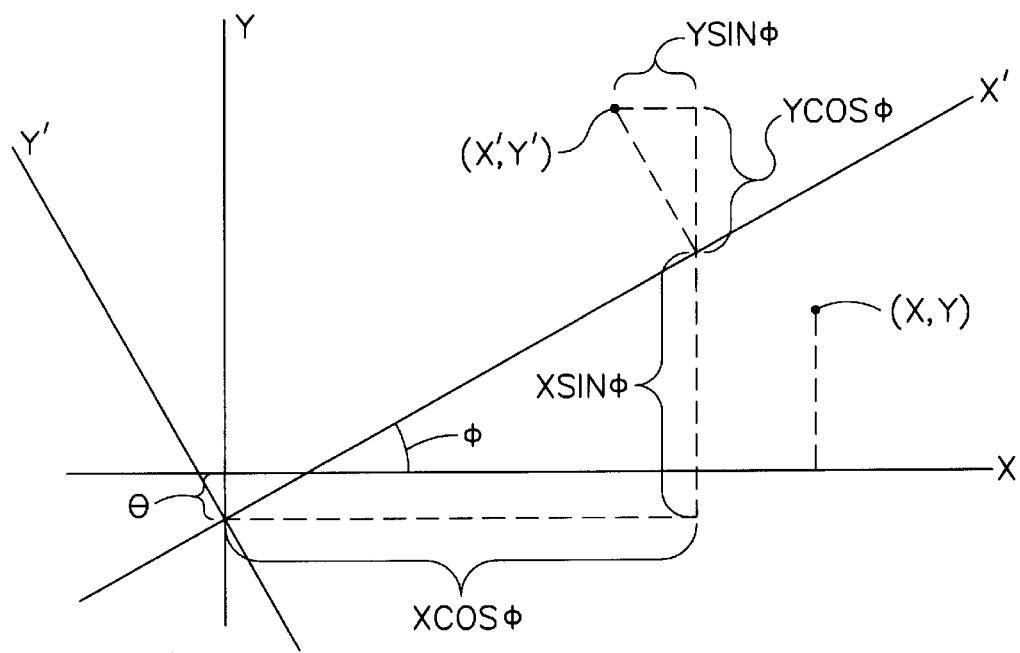
FIG. 11 illustrates an example of a coordinate translation using the pitch and the roll of the aircraft in accordance with an aspect of the present invention.

At step 920, the center points, TCP and BCP, of both ends of the runway 310 are translated to the coordinate system (x,y) relative to the horizon line using the pitch and roll of the aircraft. The translation compensates for the aircraft axis orientation so that aircraft position can be calculated. FIG. 11 illustrates an example of a coordinate translation using the pitch θ and the roll φ of the aircraft in accordance with an aspect of the present invention. (x',y') represents a point in the coordinate system of the grid 300 before translation, and (x,y) represents the point in the coordinate system relative to the horizon line 1010 after translation. For example, (x',y') represents the BCP before translation, and (x,y) represents the BCP after translation. The following equations may be used to perform the translation:

$$x' = x \cos \phi - y \sin \phi$$

$$y' = -\theta + y \cos \phi + x \sin \phi$$

Solving both equations for x:

$$y = (\theta + y' - x \sin \phi)/\cos \phi$$

$$x' = x \cos \phi - \theta \tan \phi - y' \tan \phi + x \sin \phi \tan \phi$$

$$x(\cos \phi + \sin \phi \tan \phi) = x' + \theta \tan \phi + y' \tan \phi$$

Thus, $$x = (x' + \theta \tan \phi + y' \tan \phi)/(\cos \phi + \sin \phi \tan \phi)$$

Solving both equations for y:

$$x = (x' + y \sin \phi)/\cos \phi$$

$$y' = y \cos \phi - \theta + x' \tan \phi + y \sin \phi \tan \phi$$

$$y(\cos \phi + \sin \phi \tan \phi) = y' + \theta - x' \tan \phi$$

Thus, $$y = (y' + \theta - x' \tan \phi)/(\cos \phi + \sin \phi \tan \phi)$$

Therefore, the pitch and roll translation equations are:

$$x = (x' + \theta \tan \phi + y' \tan \phi)/(\cos \phi + \sin \phi \tan \phi), \text{ and}$$

$$y = (y' + \theta - x' \tan \phi)/(\cos \phi + \sin \phi \tan \phi)$$

Figure 12:
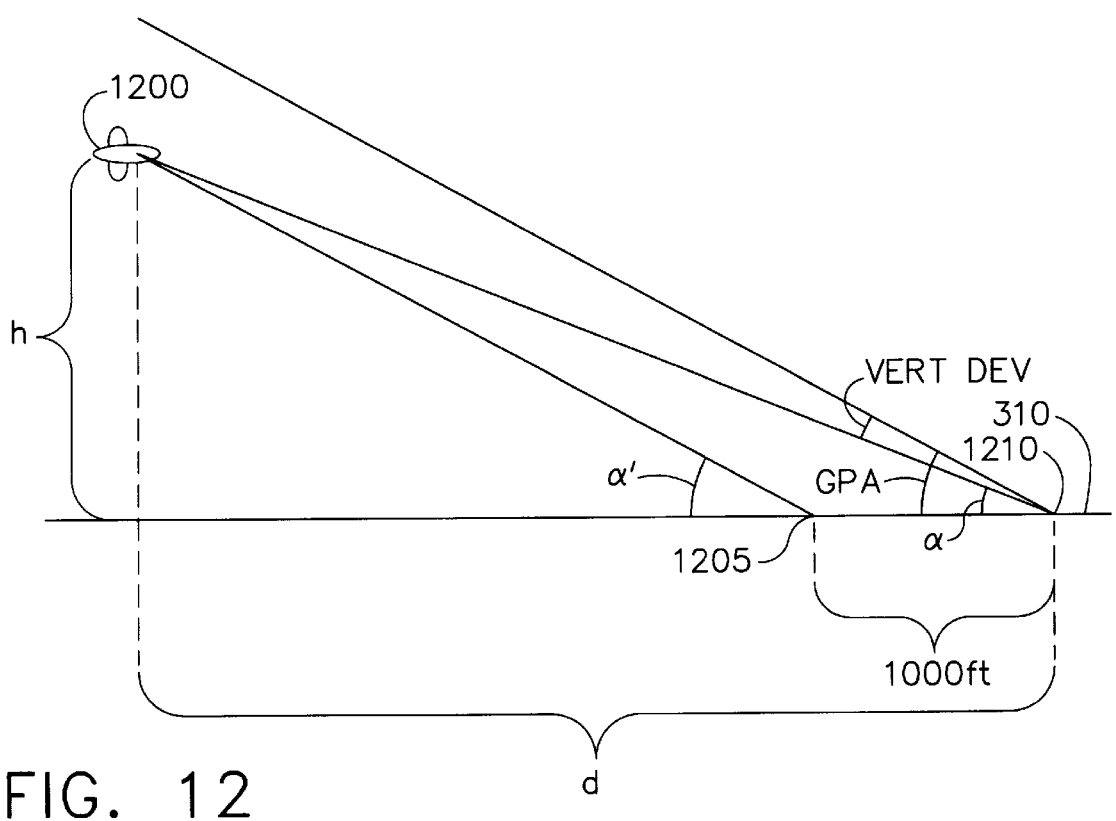
FIG. 12 illustrates a side view of the aircraft approaching the runway in accordance with an aspect of the present invention.

At step 930, the processor 120 calculates the lateral deviation and vertical deviation of the aircraft relative to the runway 310. FIG. 12 illustrates a side view of the aircraft 1200 approaching the runway 310 in accordance with an aspect of the present invention. In this example, the vertical deviation is calculated relative to the desired touchdown point 1210 of the aircraft 1200. The desired touchdown point 1210 is typically 1000 feet (ft) past the runway threshold 1205. The runway threshold 1205 is defined by the BCP. Vert Dev represents the vertical deviation of the aircraft 1200, GPA represents the desired glide path angle of the aircraft 1200, h represents the altitude of the aircraft 1200, α' represents the runway threshold depression angle, d represents a horizontal distance between the aircraft 1200 and the desired touchdown point 1210 measured along the center line of the runway 310, and α represents the actual glide path angle of the aircraft 1200. An example of calculating the vertical deviation is as follows:

$$\tan \alpha = \tan (\text{GPA} - \text{Vert Dev}) = h/d$$

For small angles, this can be approximated as $$\alpha = \text{GPA} - \text{Vert Dev} = h/d$$

Thus, $$x = h/(\text{GPA} - \text{Vert Dev})$$

$$\alpha' = h/(d - 1000\text{ft}) = h/((h/(\text{GPA} - \text{Vert Dev})) - 1000\text{ft})$$

Thus, $$\text{Vert Dev} = \text{GPA} - h/((h/\alpha') + 1000\text{ft})$$

Figure 13:
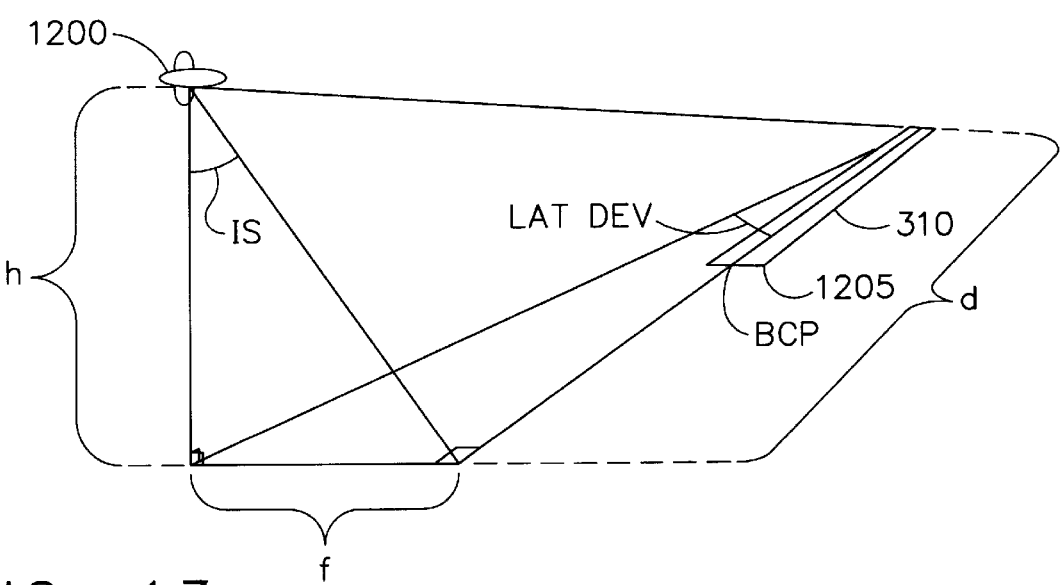
FIG. 13 illustrates a perspective view of the aircraft approaching the runway in accordance with an aspect of the present invention.

FIG. 13 illustrates a perspective view of the aircraft 1200 approaching the runway 310 in accordance with an aspect of the present invention. The runway threshold 1205 is defined by the BCP. Lat Dev represents the lateral deviation, IS represents the inverse slope, h represents the altitude of the aircraft 1200, d represents a horizontal distance between the aircraft 1200 and the desired touchdown point 1210 measured along the center line of the runway 310, and f represents a horizontal distance between the aircraft 1200 and the center line of the runway 310. An example of calculating the vertical deviation is as follows:

$$f = d^* \tan (\text{Lat Dev}) \tan (\text{IS}) = f/h = \{(h/\tan (\text{GPA} - \text{Vert Dev}))^* \tan (\text{Lat Dev})\}/h$$

Thus, $$\text{Lat Dev} = \arctan\{(\tan (\text{IS})^* h)/(h/\tan (\text{GPA} - \text{Vert Dev}))\}$$

Although certain aspects of the invention have been described herein in conjunction with the appended drawings, those skilled in the art will appreciate that the scope of the invention is not so limited. Modifications in the selection, design, and arrangement of the various components and steps discussed herein may be made without departing from the scope of the invention as set forth in the appended claims.

What is claimed is:

1. A method for providing navigational information for navigating an aircraft, said method comprising the steps of:

receiving first image data generated by an image sensor attached to the aircraft, wherein the first image data represents a first image comprising a runway and other objects captured by the image sensor, wherein the first image data comprises digital signal samples, and wherein each of the digital signal samples corresponds to a brightness value at one of a plurality of grid coordinates on a grid representing the first image;

predicting the grid coordinates defining a first set of at least three edges of the runway by using the aircraft's Nav Data, to produce predicted coordinates;

detecting a second set of at least three edges of the runway in the first image data, to produce detected edges;

determining the grid coordinates defining said detected edges, to produce edge coordinates; and correlating said predicted coordinates with said edge coordinates, to produce runway coordinates for navigating the aircraft.

2. The method of claim 1, wherein said detecting step comprises detecting the second set of at least three edges of the runway and a plurality of edges of the other objects in the first image data, to produce detected edges.

3. The method of claim 1, wherein second image data is generated in a same manner as the first image data, said method further comprising, after said correlating step, the steps of:

receiving said second image data;

detecting at least a third set of three edges of the runway in the second image data, to produce said detected edges;

determining the grid coordinates defining said detected edges, to produce said edge coordinates;

updating said predicted coordinates with said runway coordinates; and correlating said predicted coordinates with said edge coordinates, to produce said runway coordinates for navigating the aircraft.

4. The method of claim 3, wherein said third set of at least three edges of the runway in said detecting steps comprises at least three edges of the runway and a plurality of edges of the other objects.

5. The method of claim 3, further comprising, before said correlating step, the step of filtering said predicted coordinates.

6. A method for providing navigational information for navigating an aircraft, said method comprising the steps of:

receiving runway coordinates defining a runway in an image generated by an image sensor attached to the aircraft, wherein said image is represented by a plurality of grid coordinates on a grid, and wherein the plurality of grid coordinates comprises the runway coordinates; and calculating the lateral deviation and the vertical deviation of the aircraft relative to the runway by using said runway coordinates.

7. The method of claim 6, further comprising, before said calculating step, the step of:

translating said runway coordinates by using the pitch and roll of the aircraft, to produce said runway coordinates.

8. The method of claim 6, wherein said calculating step comprises the steps of:

determining the center points of both ends of the runway by using said runway coordinates;

translating said center points by using the pitch and roll of the aircraft, to produce translated center points; and calculating the lateral deviation and the vertical deviation of the aircraft relative to the runway by using said translated center points.

9. A method for providing navigational information for navigating an aircraft, said method comprising the steps of:

receiving first image data generated by an image sensor attached to the aircraft, wherein the first image data represents a first image comprising a runway and other objects captured by the image sensor, wherein the first image data comprises digital signal samples, and wherein each of the digital signal samples corresponds to a brightness value at one of a plurality of grid coordinates on a grid representing the first image;

determining the grid coordinates defining at least three edges of the runway in the first image data, to produce runway coordinates; and calculating the lateral deviation and the vertical deviation of the aircraft relative to the runway by using said runway coordinates.

10. The method of claim 9, wherein said determining step comprises the steps of:

predicting the grid coordinates a second set of at least three edges of the runway by using the aircraft's Nav Data, to produce predicted coordinates;

using the first set of at least three edges of the runway in the first image data to produce detected edges;

determining the grid coordinates defining said detected edges, to produce edge coordinates; and correlating said predicted coordinates with said edge coordinates, to produce said runway coordinates.

11. The method of claim 9, further comprising, after said determining step, the step of:

translating said runway coordinates by using the pitch and roll of the aircraft, to produce said runway coordinates.

12. The method of claim 9, wherein said calculating step comprises the steps of:

determining the center points of both ends of the runway by using said runway coordinates;

translating said center points by using the pitch and roll of the aircraft, to produce translated center points; and calculating the lateral deviation and the vertical deviation of the aircraft relative to the runway by using said translated center points.

13. The method of claim 10, further comprising, after said correlating step, the step of:

translating said runway coordinates by using the pitch and roll of the aircraft, to produce said runway coordinates.

14. A method for providing navigational information for navigating an aircraft, said method comprising the steps of:

receiving first image data generated by an image sensor attached to the aircraft, wherein the first image data represents a first image comprising a runway and other objects captured by the image sensor, wherein the first image data comprises digital signal samples, and wherein each of the digital signal samples corresponds to a brightness value at one of a plurality of grid coordinates on a grid representing the first image;

predicting the grid coordinates defining at least a first set of three edges of the runway by using the aircraft's Nav Data, to produce predicted coordinates;

detecting at least a second set of three edges of the runway and a plurality of edges of the other objects in the first image data, to produce detected edges;

determining the grid coordinates defining said detected edges, to produce edge coordinates;

correlating said predicted coordinates with said edge coordinates, to produce said runway coordinates;

determining the center points of both ends of the runway by using said runway coordinates;

translating said center points by using the pitch and roll of the aircraft, to produce translated center points; and calculating the lateral deviation and the vertical deviation of the aircraft relative to the runway by using said translated center points.

15. The method of claim 14, wherein second image data is generated in a similar manner as the first image data, said method further comprising, after said calculating step, the steps of:

receiving said second image data;

detecting at least a third set of three edges of the runway in the second image data, to produce said detected edges;

determining the grid coordinates defining said detected edges, to produce said edge coordinates;

correlating said runway coordinates with said edge coordinates, to produce said runway coordinates;

determining said center points of both ends of the runway by using said runway coordinates;

translating said center points by using the pitch and roll of the aircraft, to produce said translated center points; and calculating said lateral deviation and said vertical deviation of the aircraft relative to the runway by using said translated center points.

16. A computer-readable medium containing a set of computer executable instructions for performing a method of providing navigational information for navigating an aircraft, said method comprising the steps of:

receiving first image data generated by an image sensor attached to the aircraft, wherein the first image data represents a first image comprising a runway and other objects captured by the image sensor, wherein the first image data comprises digital signal samples, and wherein each of the digital signal samples corresponds to a brightness value at one of a plurality of grid coordinates on a grid representing the first image;

predicting the grid coordinates defining at least three edges of the runway by using the aircraft's Nav Data, to produce predicted coordinates;

using the at least three edges of the runway in the first image data to produce detected edges;

determining the grid coordinates defining said detected edges, to produce edge coordinates; and correlating said predicted coordinates with said edge coordinates, to produce runway coordinates for navigating the aircraft.

17. A computer-readable medium containing a set of computer executable instructions for performing a method of providing navigational information for navigating an aircraft, said method comprising the steps of:

receiving runway coordinates defining a runway in an image generated by an image sensor attached to the aircraft, wherein said image is represented by a plurality of grid coordinates on a grid, and wherein the plurality of grid coordinates comprises the runway coordinates; and calculating the lateral deviation and the vertical deviation of the aircraft relative to the runway by using said runway coordinates.

18. A computer-readable medium containing a set of computer executable instructions for performing a method of providing navigational information for navigating an aircraft, said method comprising the steps of:

receiving first image data generated by an image sensor attached to the aircraft, wherein the first image data represents a first image comprising a runway and other objects captured by the image sensor, wherein the first image data comprises digital signal samples, and wherein each of the digital signal samples corresponds to a brightness value at one of a plurality of grid coordinates on a grid representing the first image;

determining the grid coordinates defining at least three edges of the runway, to produce runway coordinates; and calculating the lateral deviation and the vertical deviation of the aircraft relative to the runway by using said runway coordinates.

* * * * *